US008750839B1

(12) United States Patent
Paczkowski et al.

(10) Patent No.: US 8,750,839 B1
(45) Date of Patent: Jun. 10, 2014

(54) MOBILE ACCESS TERMINAL WITH LOCAL CALL SESSION CONTROL FUNCTION (75) Inventors: Lyle Walter Paczkowski, Mission Hills, KS (US); Farni B. Weaver, Spring Hill, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 960 days.

(21) Appl. No.: 12/486,873

(22) Filed: Jun. 18, 2009

(51) Int. Cl.
*H04M 3/42* (2006.01)
*H04L 29/06* (2006.01)
*H04W 4/00* (2009.01)

(52) U.S. Cl.
USPC .............. 455/414.1; 455/414.3; 455/432.3

(58) Field of Classification Search
CPC ....................................................... H04W 8/18
USPC ........................................................ 455/414.1
See application file for complete search history.

(56) References Cited

U.S. PATENT DOCUMENTS

| 2008/0176538 | A1* | 7/2008 | Terrill et al. ............... 455/414.1 |
| 2010/0142517 | A1* | 6/2010 | Montemurro et al. ........ 370/352 |
| 2010/0223348 | A1* | 9/2010 | Przybysz et al. .............. 709/206 |

* cited by examiner

*Primary Examiner* — Huy C Ho (57) ABSTRACT

A computing device, computing system, method, and medium are provided for utilizing a local Call Session Control Function (CSCF) server located on a mobile access terminal to facilitate access to application services hosted by an application server. An application-service client corresponding to the application server is instantiated on the mobile access terminal and interacts with the local CSCF server via a local control interface. The local CSCF server includes features of a Serving Call Session Control Function (S-CSCF), and thereby enables authentication, interoperability testing, and control functions to be performed in the operating environment on the MAT. The local CSCF server interacts according to a predetermined relationship with an S-CSCF on the IMS network to facilitate access to application services.

20 Claims, 4 Drawing Sheets

MOBILE ACCESS TERMINAL WITH LOCAL CALL SESSION CONTROL FUNCTION

SUMMARY

Embodiments of the invention are defined by the claims below, not this summary. A high-level overview of embodiments of the invention are provided here for that reason, to provide an overview of the disclosure.

In a first aspect, a set of computer-executable instructions provides an exemplary method for accessing application services from a mobile access terminal (MAT) via an internet protocol multimedia subsystem (IMS) network associated with a service provider. Embodiments of the exemplary method include starting an application-service client on the MAT. The application-service client communicates with an application server that hosts application services. In embodiments, the exemplary method further includes invoking a local CSCF server in the operating environment of the MAT. The local CSCF server includes several features of a Serving Call Session Control Function (S-CSCF) and interacts according to a predetermined relationship with an S-CSCF hosted by the IMS network. A local control interface is established to facilitate interaction between the local CSCF server and the application-service client. In embodiments, the local control interface includes features of an IMS Service Control (ISC) interface. In embodiments, the local CSCF server interacts with the S-CSCF to facilitate access to application services hosted by the application server.

In a second aspect, a set of computer-executable instructions provides an exemplary method for using a local CSCF server running in the operating environment of the MAT to receive application services via an IMS network associated with a service provider. In embodiments, the local CSCF server includes one or more features of an S-CSCF. Embodiments of the exemplary method include detecting instantiation of an application-service client on the MAT. In embodiments, the application-service client corresponds to an IMS-conforming application service hosted by an application server. The exemplary method can further include establishing a local control interface on the MAT that facilitates interaction between the local CSCF server and the application-service client. In some embodiments, the local control interface provides one or more aspects of an ISC interface. Further embodiments of the exemplary method include determining that the application service is interoperable with the IMS network by retrieving operability information from the application-service client and testing the operability information using the local CSCF server.

In another aspect, a communications device adapted to function as a MAT capable of consuming application services via an IMS network maintained by a service provider is provided. Embodiments of the device include an application-service client that corresponds to an IMS-conforming application service hosted by an application server; a local CSCF server that includes one or more functional aspects of an S-CSCF and that interacts according to a predetermined relationship with an S-CSCF hosted by the IMS network; and a local control interface that provides one or more aspects of ISC interface and that facilitates interaction between the local CSCF server and the application-service client to enable access to application services provided by the application server.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for utilizing a local CSCF server running on a mobile access terminal to facilitate access to and control of application services through an IMS network. According to embodiments of the invention, a service operator can create and deploy a customized local CSCF server upon a mobile access terminal (MAT) such that the service function will interact in a bidirectional fashion with a local MAT application and the service operator's remote or hosted IMS proxy server and service (CSCF). By implementing embodiments of the invention, service operators can create the ability for applications to interact with the local CSCF server via a local control interface such that interoperability is maintained locally between the application and the local CSCF server.

The subject matter of the present invention is described with specificity herein to meet statutory requirements. However, the description itself is not intended to limit the scope of this disclosure to only the embodiments described herein. Rather, the inventors have contemplated that the claimed subject matter might also be embodied in other ways, to include different steps or combinations of steps similar to the ones described in this document, in conjunction with other technologies. Moreover, although the terms "step" and/or "block" may be used herein to connote different components of methods employed, the terms should not be interpreted as implying any particular order among or between various steps herein disclosed except when the order of individual steps is explicitly asserted.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AS | Application Server |
| ASC | Application-Service Client |
| CDMA | Code Division Multiple Access |
| CDN | Content Delivery Network |
| CD-ROM | Compact Disc Read-Only Memory |
| CSCF | Call Session Control Function |
| DHCP | Dynamic Host Configuration Protocol |
| DNS | Domain Name Server |
| DSL | Digital Subscriber Line |
| DVD | Digital Versatile Disc |
| EDGE | Enhanced Data Rates for GSM Evolution |
| EEPROM | Electrically Erasable Programmable Read-Only Memory |
| EV-DO | Evolution-Data Optimized |
| GPRS | General Packet Radio Service |

-continued

| | |
|---|---|
| GSM | Global System for Mobile Communications |
| HSS | Home Subscriber Server |
| I/O | Input/Output |
| I-CSCF | Interrogating Call Session Control Function |
| IMS | IP Multimedia Subsystem |
| IP | Internet Protocol |
| ISC | IMS Service Control |
| ISP | Internet Service Provider |
| LCD | Liquid Crystal Display |
| LCI | Local Control Interface |
| MAT | Mobile Access Terminal |
| MNO | Mobile Network Operator |
| NNI | Network to Network Interface |
| P-CSCF | Proxy Call Session Control Function |
| PDA | Personal Digital Assistant |
| POTS | Plain Old Telephone Service |
| RAM | Random Access Memory |
| ROM | Read-Only Memory |
| S-CSCF | Serving Call Session Control Function |
| SIP | Session Initiation Protocol |
| UMTS | Universal Mobile Telecommunications System |
| Wi-Max | Worldwide Interoperability for Microwave Access |

Embodiments of the present invention may be embodied as, among other things: a method, system, device, or set of instructions embodied on one or more computer-readable media. Computer-readable media include both volatile and nonvolatile media, removable and nonremovable media, and contemplates media readable by a database, a switch, a server, a communications device and various other devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Generally, program modules including routines, programs, objects, components, data structures, etc., refer to code that perform particular tasks or implement particular abstract data types when executed by a processor in a computer or other machine, such as a personal data assistant, cellular phone, portable media player, or other handheld device. Aspects of the invention may be practiced in a variety of system configurations, including hand-held devices, consumer electronics, general-purpose computers, more specialty computing devices, microcomputers (servers), mobile devices, personal digital assistants (PDAs), cellular phones, mobile media devices, and the like. Aspects of the invention may also be practiced in distributed computing environments where tasks are performed by remote-processing devices that are linked through a communications network.

Figure 1:
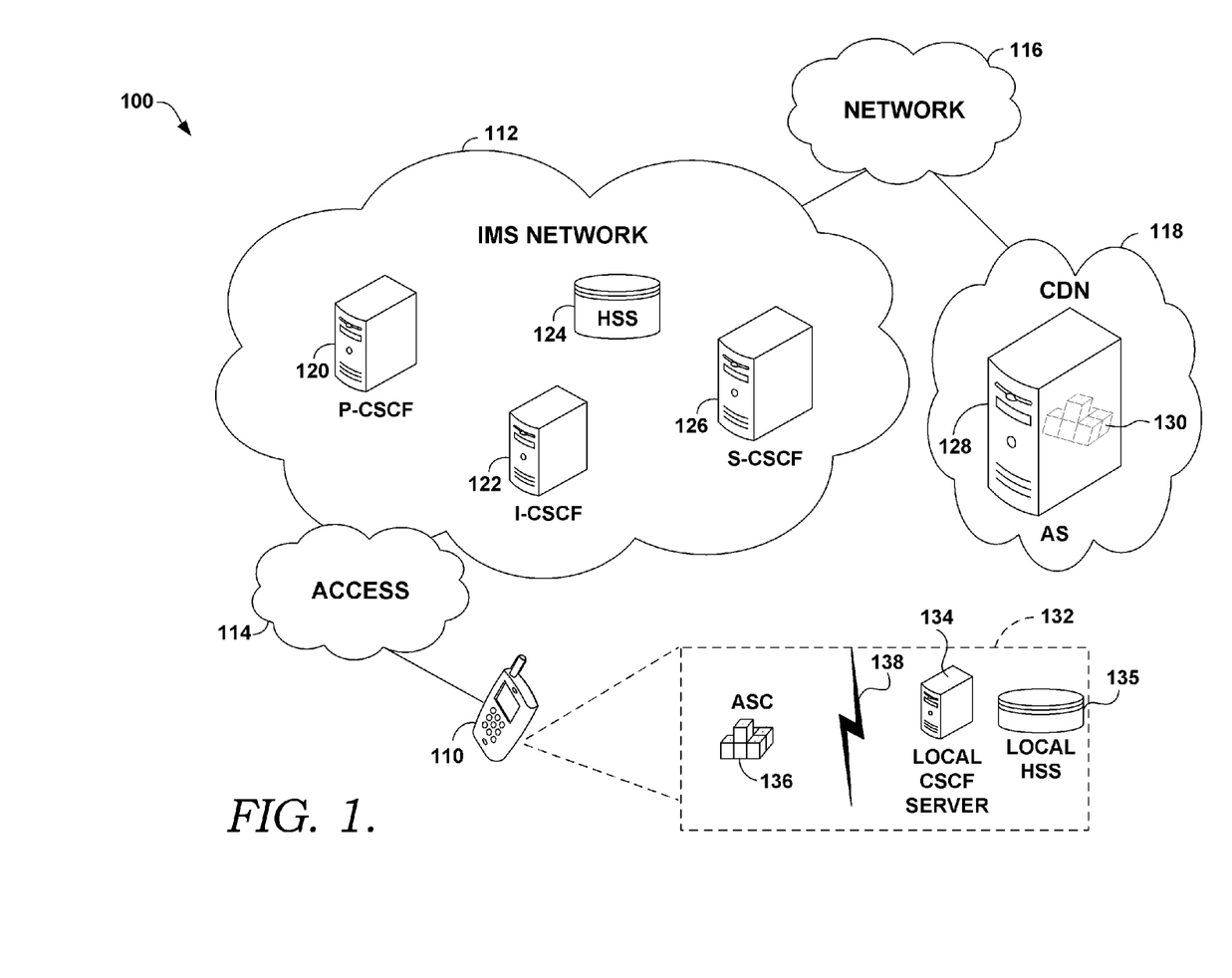
FIG. 1 depicts an illustrative network environment in accordance with embodiments of the present invention.

Turning now to FIG. 1, an illustrative operating environment 100 suitable for implementation of embodiments of the present invention is depicted. Illustrative operating environment 100 includes a mobile access terminal (MAT) 110, an access network 114, an IMS network 112, a network 116, and a content delivery network (CDN) 118. The exemplary network environment 100 shown in FIG. 1 is an example of one suitable network environment 100 and is not intended to suggest any limitation as to the scope of use or functionality of embodiments of the inventions disclosed throughout this document. Neither should the exemplary network environment 100 be interpreted as having any dependency or requirement related to any single component or combination of components illustrated therein.

MAT 110 is a computing device capable of communicating with an IMS network 112 to facilitate access to application services 130 hosted by an application server (AS) 128, which can be located in a CDN 118. MAT 110 can be any kind of computing device having computer-readable media and one or more processors such as, for example, a personal computer, a computing terminal, a mobile communications device (e.g., a mobile phone, a PDA, a portable media player, etc.), and the like. In some embodiments of the present invention, MAT 110 includes radio equipment that facilitates the transmission of wireless communication signals to and from MAT 110. Illustrative protocols that can be utilized in connection with embodiments of the present invention include CDMA, EDGE, EV-DO, GPRS, GSM, UMTS, Wi-Fi™ WiMAX, and the like. Radio equipment can facilitate wireless communications between MAT 110 and a local, regional, national, or even global, telecommunications network.

In some embodiments, AS 128 can be located within a CDN 118, within IMS network 112, within network 116, or independent of any of the networks 112, 116, and 118 illustrated in FIG. 1. In some embodiments, AS 128 can be implemented on a communications device such as a mobile phone, a PDA, a portable media player, or the like (and may be capable of performing the role of a MAT in another context). In other embodiments, AS 128 can be implemented on a personal computer, dedicated computer, microcomputer, distributed computer system, or the like.

According to various embodiments of the invention, MAT 110 accesses IMS network 112 through an access network 114, which can include any of the various types of access networks available to facilitate the communications described herein. For example, in embodiments, MAT 110 can connect to IMS network 112 through fixed access (e.g., Digital Subscriber Line (DSL), cable modems, Ethernet, etc.), mobile access (e.g. W-CDMA, CDMA2000, GSM, GPRS, etc.), and wireless access (e.g., WLAN, WiMAX, etc.). In some embodiments, other telecommunications systems such as plain old telephone service (POTS), H.323, and non IMS-compatible VoIP systems, can connect to IMS network 112 through gateways.

Previously developed aspects of IMS network 112 are described in a number of technical specifications of the 3rd Generation Partnership Project (3GPP), the 3rd Generation Partnership Project (3GPP2), and the Telecoms & Internet converged Services & Protocols for Advanced Networks (TISPAN). In IMS network 112, services are provided by a call session control function (CSCF) in accordance with service logic provisioned in an application server such as, for example, AS 128. In accordance with the IMS approach, the CSCF may function as a session initiation protocol (SIP) registrar for registering SIP user agents (e.g., clients located on MAT 110) communicating via access network 114 and may function as a SIP proxy server for routing SIP signaling messages to and from access network 114 (and thus, MAT 210), network 116, and CDN 118. SIP is an application layer control protocol for creating, modifying, and terminating sessions with one or more users, where sessions include internet telephone calls, multimedia distribution, and the like. SIP is described in various technical specifications such as RFC-3261.

In a typical IMS network 112, the CSCF is generally characterized by a set of service functions (e.g., servers): a Proxy-CSCF (P-CSCF) 120, an Interrogating-CSCF (I-CSCF) 122, and a Serving-CSCF (S-CSCF) 126. In embodiments, each of P-CSCF 120, I-CSCF 122, and S-CSCF 126 can be implemented on its own machine (e.g., network node). In other embodiments, any two or more of P-CSCF 120, I-CSCF 122, and S-CSCF 126 can be implemented on a single machine and in further embodiments, P-CSCF 120, I-CSCF 122, and/or S-CSCF 126 can be distributed over several machines. In some embodiments, as explained in further detail below, IMS network 112 does not include P-CSCF 120. As illustrated in FIG. 1, IMS network 112 further includes a Home Subscriber Server (HSS) 124. HSS 124 includes a user database that supports the IMS network 112 entities that actually handle calls such as, e.g., I-CSCF 122 and P-CSCF 126. HSS 124 maintains subscription-related information (subscriber profiles), performs authentication and authorization of users, and can provide information about the subscriber's location and IP addressing information.

To better appreciate the more salient aspects of embodiments of the present invention, it is helpful to bear in mind some of the general aspects of existing IMS networks. In a typical IMS network, the P-CSCF is a SIP proxy that is the first point of contact for mobile access terminals (MATs). A P-CSCF can be located either in a visited network or in the home network. In some implementations, the P-CSCF can consist of a Session Border Controller (SBC). Generally, a MAT discovers its P-CSCF with either DHCP, or it is assigned in the PDP Context (in General Packet Radio Service (GPRS)).

In existing IMS networks, a P-CSCF is assigned to a MAT during registration, and does not change for the duration of the call session. Also in existing IMS networks, the P-CSCF authenticates the user and establishes an IPsec security association with the MAT. Other nodes trust the P-CSCF, and do not have to authenticate the user again. As will be explained further below, any number of these or other functions can be incorporated into the local CSCF server on the MAT. In some embodiments of the present invention, the local CSCF server performs all of the relevant functions normally associated with the P-CSCF, and in some implementations, the IMS network may not even need to have a P-CSCF.

An Interrogating-CSCF (I-CSCF) is typically located at the edge of an administrative domain. The I-CSCF's IP address is published in the Domain Name System (DNS) of the domain, so that remote servers can find it and use it as a forwarding point for SIP packets to the domain. The I-CSCF queries the HSS to retrieve the MAT location and then routes the SIP request to its assigned S-CSCF. In this manner, the HSS assigns the S-CSCF to a user when it is queried by the I-CSCF.

A Serving-CSCF (S-CSCF) is the central node of the signaling plane in an IMS network. The S-CSCF is a SIP server and also performs session control. The S-CSCF retrieves user profile information from the HSS. In typical IMS networks, the S-CSCF handles SIP registrations; decides to which application server(s) SIP messages will be forwarded, in order to facilitate the access to application services; provides routing services; enforces policies of the network operator; and numerous other functions. Additionally, although the various figures herein illustrate only one S-CSCF in each IMS network, there can be, and often are, multiple S-CSCFs in an IMS network.

In embodiments, S-CSCF 126 may perform functions in accordance with service logic located in one or more other network elements, such as AS 128. Although FIG. 1 shows S-CSCF 126 communicatively coupled to only one application server, it is to be understood that S-CSCF 126 could be communicatively coupled to multiple application servers. For example, the service logic for different services may be located in different application servers. In IMS network 112, S-CSCF 126 communicates with AS 128 via a an IMS Service Control (ISC) interface. The ISC interface allows for S-CSCF 126 to control various aspects of application service 130 by communicating control signals using SIP to AS 128.

In addition to IMS network 112, which is an example of an implementation according to embodiments of the present invention, FIG. 1 also illustrates a novel modification to the typical IMS network environment. As shown in FIG. 1, MAT 110 includes an operating environment 132. Operating environment 132 can include any type of operating environment capable of supporting the features described herein such as, for example, various types of operating systems that can be implemented on MAT 110. As illustrated in FIG. 1, operating environment 132 includes an local CSCF server 134, a local HSS 135, and an application-service client (ASC) 136.

According to embodiments of the present invention, ISF 134 is a server running in operating environment 132 on MAT 110. In embodiments, ISF 134 includes one or more functional aspects of an S-CSCF, and in some embodiments, ISF 134 also includes one or more functional aspects of a P-CSCF. That is, ISF 134 is essentially a CSCF proxy that is configured to run in operating environment 132 and to provide functionality normally provided by an S-CSCF and, in some cases, a P-CSCF. ISF 134 interacts with ASC 136 via a local control interface (LCI) 138. In embodiments, LCI 138 includes one or more functional aspects of an ISC interface.

According to various embodiments, ASC 136 is a client associated with an application service 130 hosted by AS 128. In some embodiments, ASC 136 includes various functional aspects associated with AS 128. That is, ASC 136 appears to ISF 134 as an application server, and in some embodiments, the interactions between ASC 136 and ISF 134 are similar to interactions between a typical S-CSCF and an application server such as, e.g., AS 128. By interacting with ASC 136 via LCI 138, ISF 134 can control various aspects of a call session, and can facilitate access to application services hosted by AS 128. In embodiments, ASC 136 communicates according to a predetermined relationship with AS 128 such that ASC 136.

In embodiments, ISF 134 communicates with S-CSCF 126 according to a predetermined relationship. This relationship may be the same for any MAT 110 that interacts with an assigned S-CSCF on IMS network 112. In some embodiments, ISF 134 always interacts with the same S-CSCF, thereby eliminating the need for a registration process to include discovery and assignment of an S-CSCF. Additionally, it should be understood that, in some embodiments, MAT 110 can include one ISF 134, while in other embodiments, MAT 110 can include multiple ISFs 134. In some embodiments, different ISFs 134 on a MAT 110 can correspond to different S-CSCFs on IMS network 112. In other embodiments, all of the ISFs 134 on a particular MAT 110 can be associated with a single S-CSCF. In still further embodiments, an ISF 134 can be created and instantiated for each ASC 136 that is invoked (i.e., instantiated) on MAT 110. In this way, multiple ISFs 134 can simultaneously facilitate access to applications services from various application servers.

According to various embodiments of the present invention, local HSS 135 can include a database or other storage component that stores and maintains user profiles. In an embodiment, local HSS 135 communicates with HSS 124 to download (and update, periodically, continuously, or on-demand) user profiles associated with users of MAT 110. For example, a user profile may include filter criteria that S-CSCF 126 uses to determine what SIP signaling S-CSCF 126 should send or proxy to an application server, such as AS 128, and under what conditions, in order to provide the services subscribed to by the mobile access terminal's user. The filter criteria may also specify which application server the SIP signaling should be sent or proxied to. Additional authentication, personalization, and other types of data can be included in a network user profile Additionally, user profiles can include service profiles associated with MAT 110 itself, or users thereof, can be retrieved from HSS 124. In some embodiments, only portions of user profiles are retrieved. For instance, in an embodiment, local HSS 135 retrieves those portions of a user profile that are relevant to the functions and tasks that ISF 134 performs with respect to ASC 136.

In embodiments, more than one user can be associated with a MAT 110, in which case local HSS 135 can retrieve user profiles corresponding to each of the users associated with the MAT 110. In this manner, ISF 134 can selectively provide access to application service 130 based on a particular user's credentials, service profiles, restrictions, and the like. In some embodiments, ISF 134 can update user profile information stored in local HSS 135, which can then update the corresponding information maintained by HSS 134. In embodiments, HSS 134 can update the user profile information maintained by local HSS 135, as well.

In embodiments of the present invention, ISF 134 can interact with ASC 136 to perform various tasks previously associated with an S-CSCF such as, e.g., S-CSCF 126. ISF 134 interacts, according to a predetermined relationship, with S-CSCF 126 to facilitate access to application services hosted by AS 128. In this manner, various embodiments of the present invention allow for a variety of tasks to be performed on the MAT 110, rather than between the MAT 110 and IMS network 112. For example, in embodiments, ISF 134 can authenticate application services 230, authenticate users attempting to access application service 130, can apply security policies, can provide control of application service 130 via ASC 136, can verify the interoperability of application service 130 with the IMS network 112 (and access network 114), and the like.

Figure 2:
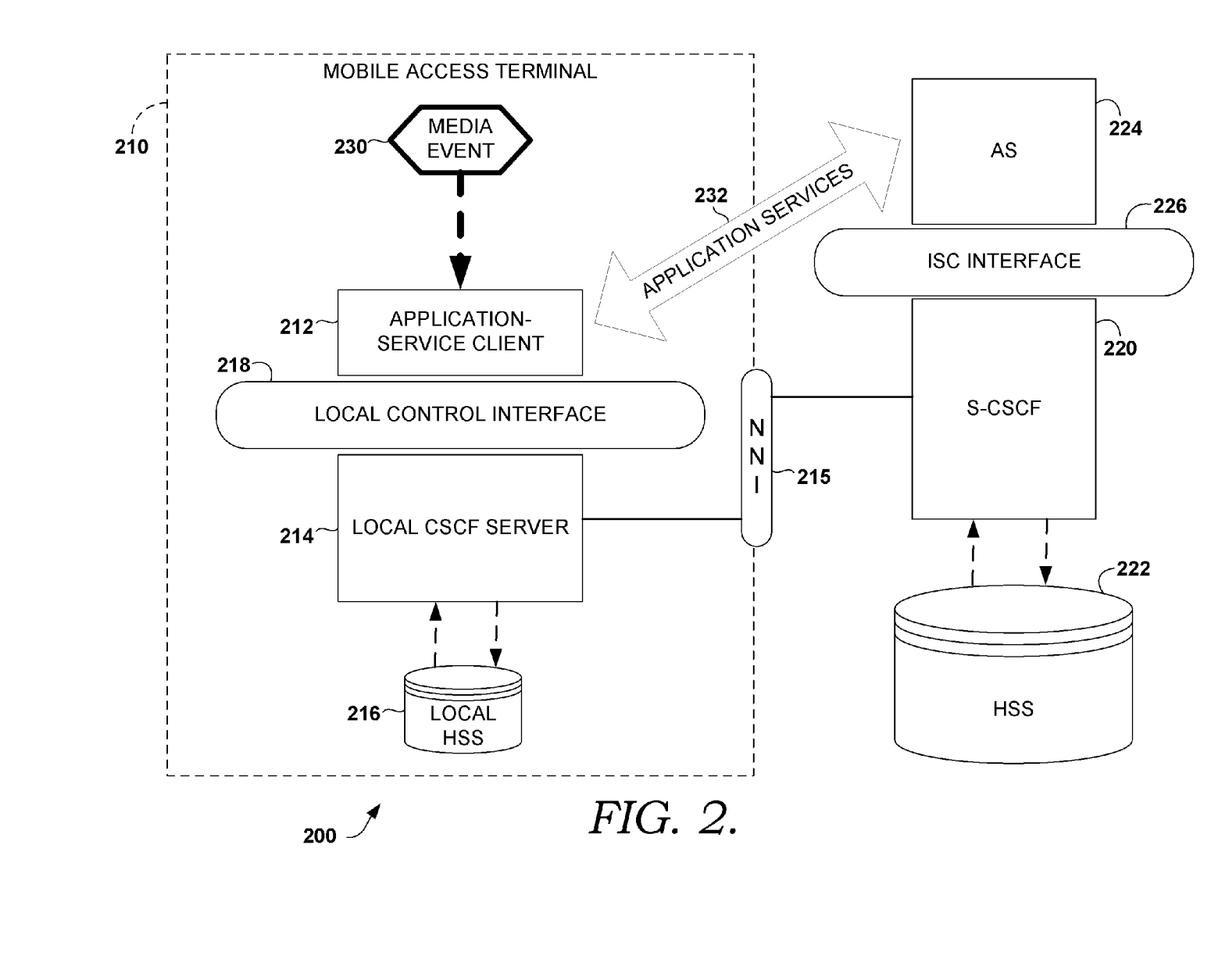
FIG. 2 depicts an exemplary operating environment in accordance with embodiments of the present invention.

Turning to FIG. 2, an exemplary implementation of the present invention is depicted. A mobile access terminal (MAT) 210 is illustrated and includes an local CSCF server 214. According to embodiments of the present invention, the local CSCF server 214 is composed of functional aspects of an S-CSCF. In an embodiment, local CSCF server 214 includes authentication logic, validation logic, and the like. In embodiments, local CSCF server 214 detects instantiation of an application-service client 212. In other embodiments, other modules such as application management systems detect instantiation of application-service client 212. As illustrated in FIG. 2, an application-service client 312 can be instantiated in response to a media event 230. As used herein, a media event 230 can include any type of detectable event such as, for example, user input, function calls, communications from applications, changes in geographic location, and the like.

As further illustrated in FIG. 2, a local control interface 218 is established to facilitate interaction (i.e., communication) between the application-service client 212 and the local CSCF server 214. In embodiments, local control interface 218 includes one or more features of an ISC interface, but is constructed to exist on a MAT 210 and interact according to a predetermined relationship with an S-CSCF 220 on an IMS network. The local CSCF server 214 communicates with the application-service client 212 to perform a number of tasks. In an embodiment, the local CSCF server 214 references user profiles stored in a local HSS 216. The local HSS 216 can include a database on the MAT 210 that is populated by the HSS 222 on the network. MAT 210 can include components for communicating with the HSS 222 on the network to receive user profiles or portions of user profiles (referred to generally herein as "user profiles").

In some embodiments, for example, a single communications device may be used by several different users (e.g., friends, family members, etc.), each of whom has a corresponding user profile. Because the MAT 210 includes a local HSS 216, accounts can be managed for several different users of a single MAT 210. Accordingly, local CSCF server 214 can reference user profiles to authenticate users, apply security policies, grant or deny access to services based on permission attributes in the user profiles, and the like. In some embodiments, for example, a user profile can include preference information that can be used to personalize a user interface, configure application settings, and the like.

With continued reference to FIG. 2, the local CSCF server 214 can interact with application-service client 212 to identify the corresponding application service, identify media requirements, control various aspects of the delivery of application services, and the like. In some embodiments, local CSCF server 214 can retrieve information from application-service client 212 that can be used to perform various tasks. In embodiments, application-service client 212 can provide addressing information associated with a corresponding application server (AS) 224, charging information, compatibility information, and the like.

To facilitate access to application services by the MAT 210, local CSCF server 214 interacts with S-CSCF 220 according to a predetermined relationship. In embodiments, the predetermined relationship is always the same, and in some embodiments, the relationship is the same for every local CSCF server in the network. According to some embodiments, of the present invention, local CSCF server 214 interacts with S-CSCF 220 via a network-to-network interface (NNI) 215. This is possible because local CSCF server 214 behaves, in many respects, just like a network S-CSCF 220, and is structured in a similar manner. Thus, in various embodiments, the interface (NNI) 215 between local CSCF server 214 and S-CSCF is essentially an interface between two servers (functions). It should be understood that an NNI 215 offers significant advantages in simplicity, efficiency, and manageability over typical device-to-network interfaces.

In one embodiment, local CSCF server 214 retrieves interoperability information from application-service client 212. Interoperability information can include any information necessary or useful for determining whether the application service hosted by AS 224 and corresponding to application-service client 212 is interoperable (i.e., compatible) with the service provider's network (including, e.g., the IMS network, the access network, the core network, and the like). Without the capabilities offered by the present invention, when an application is installed on a MAT 210, the application must generally be checked against a multitude of nodes of the network to determine whether the application is interoperable. In some cases, this involves several checks in an access network, several more checks in a core network, and several checks in an IMS network. Embodiments of the present invention minimize the extensive regression and performance testing previously required to deploy new MAT applications.

In various embodiments, local CSCF server 214 is trusted by all other nodes and server functions on the service provider's network. Because the local CSCF server 214 is intimately associated with the S-CSCF 220, many of the steps typically involved in establishing a call session via an IMS network can be either localized to the MAT 210 or eliminated altogether. For instance, upon registration, a MAT 210 employing local CSCF server 214 will not need to signal a P-CSCF. This means that an access network will not need to discover a P-CSCF to communicate with MAT 210. Additionally, because local CSCF server 214 is already intimately associated with an S-CSCF, there may be no need for a P-CSCF to perform a DNS look-up to discover an appropriate I-CSCF to route messages. There also may be no need for an I-CSCF to perform an HSS look-up to determine the S-CSCF associated with MAT 210. In some embodiments, however, the I-CSCF functions may still be necessary when MAT 210 is communicating through a visited network. Moreover, utilizing embodiments of the present invention can obviate the necessity of the S-CSCF 220 querying the HSS 222 to register the MAT 210 as being served by the S-CSCF 220. Various other advantageous and efficiencies associated with embodiments of the invention will become apparent to those having skill in the relevant arts.

Figure 3:
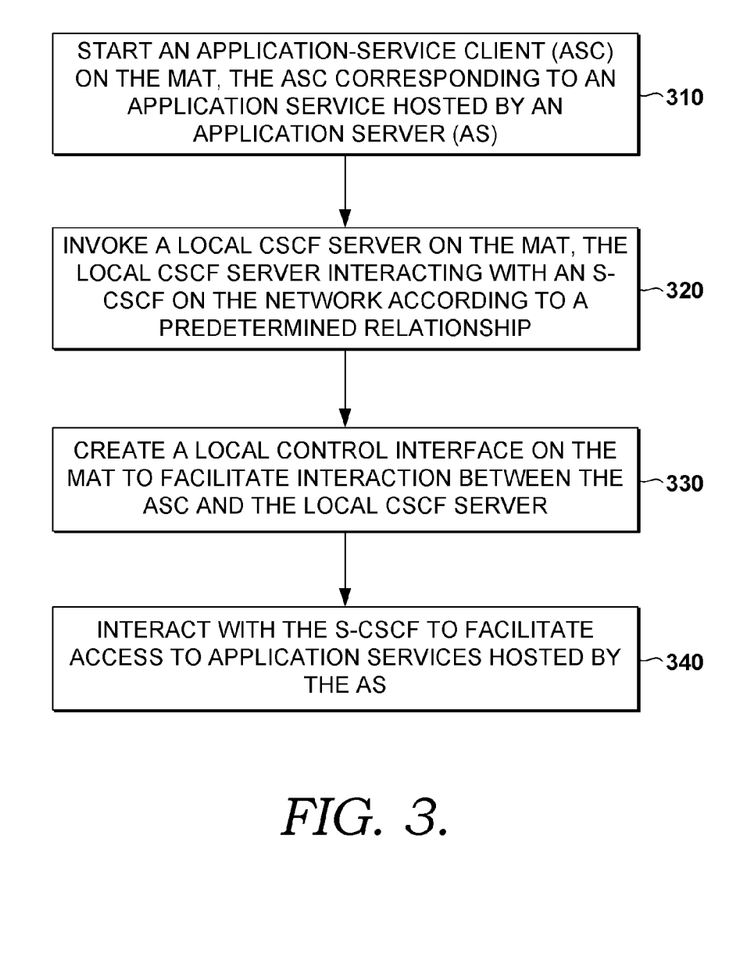
FIG. 3 depicts an illustrative method of accessing application services from a mobile access terminal (MAT) via an internet protocol multimedia subsystem (IMS) network in accordance with embodiments of the present invention.

To recapitulate, we have described a computing system, a communications device, an operating environment, and methods for facilitating access to application services by a mobile access terminal (MAT) using a local CSCF server located on the MAT. Turning to FIG. 3, a flow diagram is provided, showing an illustrative method 300 of accessing application services from a MAT via an IMS network associated with a service provider. According to embodiments of the illustrative method 300, an exemplary first step, step 310, includes starting an application-service client (ASC) in an operating environment on a MAT. In embodiments, the ASC communicates with an application server (AS) that hosts an application service. At step 320, a local CSCF server is invoked on the MAT. In embodiments, the local CSCF server includes one or more features of a Serving Call Session Control Function (S-CSCF). The local CSCF server interacts according to a predetermined relationship with an S-CSCF hosted by the IMS network. In an embodiment, the local CSCF server communicates with the S-CSCF through a network-to-network interface (NNI).

As illustrated at step 330, embodiments of the exemplary method 300 include creating a local control interface on the MAT to facilitate interaction between the ASC and the local CSCF server. In some embodiments, the local control interface includes one or more features of an IMS Service Control (ISC) interface. As shown at a final illustrative step, step 340, the local CSCF server interacts with the S-CSCF to facilitate access to application services hosted by the application server. In embodiments, the exemplary method 300 may include additional steps or tasks, as well.

For example, in an embodiment, a local HSS-function on the MAT retrieves a portion of a user profile corresponding to a user of the MAT from an HSS associated with the IMS network. The user-profile portion can include various types of information such as authentication information and IMS service qualifications associated with the user. IMS service qualifications can include indicators, filters, and the like that allow the local CSCF server to restrict the user's access to services and functions to which the user is entitled by applying the service qualifications to service requests.

Figure 4:
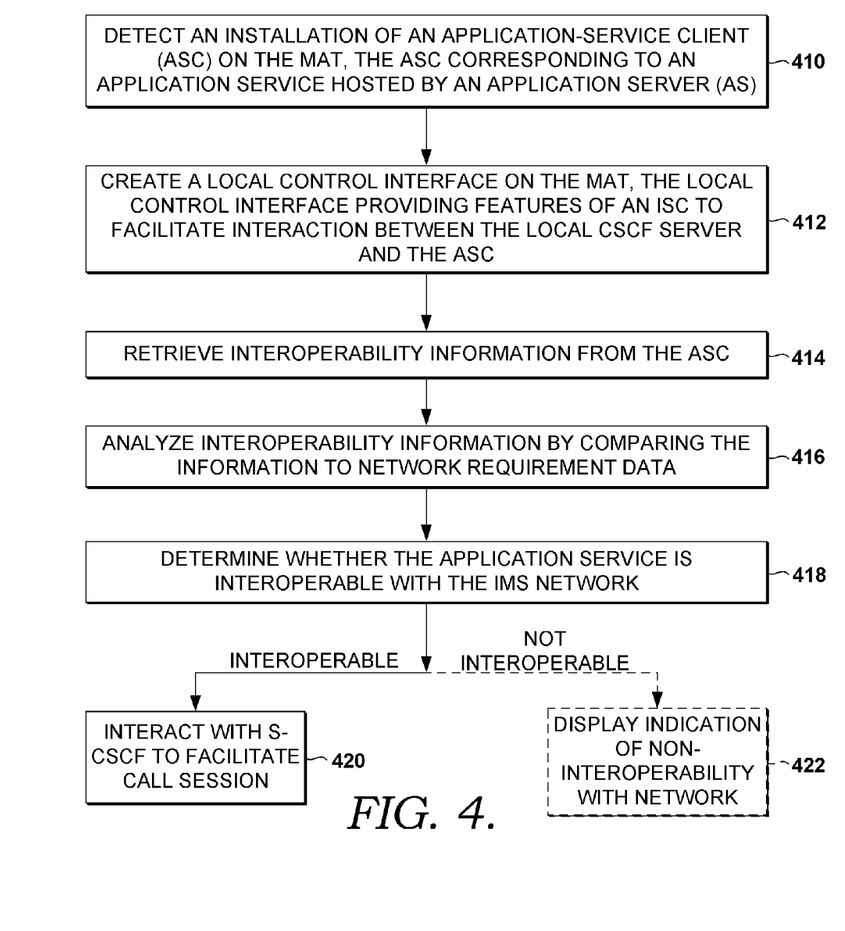
FIG. 4 depicts an illustrative method of using an local CSCF server running in the operating environment of the MAT to receive application services via an IMS network in accordance with embodiments of the present invention.

Turning now to FIG. 4, a flow diagram showing an illustrative method 400 of using a local CSCF server running in the operating environment of a mobile access terminal (MAT) to receive application services via an internet IMS network associated with a service provider. According to various embodiments of the illustrative method 400, a first illustrative step, step 410, includes detecting an installation of an application-service client (ASC) on the MAT. The ASC corresponds to an application service hosted by an application server (AS). At an exemplary step 412, a local control interface is created on the MAT. The local control interface includes features of an ISC interface and facilitates interaction between the local CSCF server and the ASC.

As shown at step 414, the local CSCF server retrieves interoperability information from the ASC and, at step 416, analyzes the interoperability information by comparing the information to network requirement data. In embodiments, the local CSCF server retrieves network requirement data from the S-CSCF. In further embodiments, network requirement data is stored on the MAT and is referenced by the local CSCF server. The local CSCF server determines whether the application service is interoperable with the IMS network. In embodiments, this process may be completed upon installation of an application service, and in other embodiments, the process may be completed upon each invocation of the application service. As illustrated in FIG. 4, if the application service is interoperable with the IMS network, the local CSCF server interacts with the S-CSCF and ASC to facilitate a call session, thereby enabling access to application services, as shown at step 420. If, on the other hand, the application service is not interoperable with the network, an indication of non-interoperability can be displayed to the user, as shown at step 422.

In some embodiments, invocation of additional application-service clients can be detected. In embodiments, additional local CSCF servers can be invoked to interact with the additional application-service clients via additional local control interfaces. In this way, multiple users can access application services, in accordance with their respective service agreements, from a common MAT. In other embodiments, a single user can access multiple application services from the MAT. It should also be apparent that embodiments of the present invention can allow for a MAT to effectively function as an application server, and may enable, for example, a MAT to host an application service consumable by another MAT.

Many different arrangements of the various components depicted, as well as components not shown, are possible without departing from the spirit and scope of the present invention. Embodiments of the present invention have been described with the intent to be illustrative rather than restrictive. A skilled artisan may develop alternative means of implementing the aforementioned improvements without departing from the scope of the present invention.

Additionally, implementation of embodiments of the present invention can allow for efficient modification of other processes and relationships associated with an IMS network. For instance, in some embodiments, multiples of applications can be created and deployed to various MATs without the need for extensive regression and interoperability testing on the application and signaling plane. Once the ISC specifications for each MAT have been established and published, programmers could develop applications without express consent from the service provider. Accordingly, in some embodiments, business relationships around service level agreements may be all that is necessary to create new MAT applications.

It will be further understood that certain features and subcombinations are of utility and may be employed without reference to other features and subcombinations and are contemplated within the scope of the claims.

The invention claimed is:

1. One or more non-transitory computer-readable media having computer-executable instructions embodied thereon for performing a method of accessing an application service from a mobile access terminal (MAT) via an internet protocol multimedia subsystem (IMS) network associated with a service provider, the method comprising:

starting an application-service client on the MAT, the application-service client comprising a client program that communicates with an application server to facilitate access to an application service located in the application server;

invoking a local Call Session Control Function (CSCF) server on the MAT, the local CSCF server comprising one or more features of a Serving Call Session Control Function (S-CSCF), the local CSCF server interacts, according to a predetermined relationship, with an S-CSCF hosted by the IMS network to facilitate access to the application service by the MAT, wherein the predetermined relationship is determined in advance based on a specification of the MAT that defines the one or more features of the S-CSCF executable on the MAT;

creating a local control interface on the MAT, the local control interface comprising one or more features of an IMS Service Control (ISC) interface, wherein the local control interface facilitates interaction between the local CSCF server and the application-service client; and interacting with the S-CSCF associated with the IMS network to facilitate access to the application service.

2. The media of claim 1, further comprising retrieving, from a Home Subscriber Server (HSS) associated with the IMS network, a portion of a user profile corresponding to a user of the MAT, wherein the user-profile portion comprises one or more application service restrictions imposed on the user.

3. The media of claim 2, wherein the user-profile portion is stored in a local HSS on the MAT.

4. The media of claim 3, wherein the local CSCF server enforces the one or more application service restrictions imposed on the user when facilitating access to the application service.

5. The media of claim 1, further comprising authenticating a user of the MAT by utilizing the local CSCF server to verify authentication credentials provided by the user.

6. The media of claim 1, further comprising determining that the application-service client is interoperable with the IMS network, wherein said determination is made by the local CSCF server by retrieving interoperability information from the application-service client, wherein the interoperability information comprises information of compatibility between the application-service client and the IMS network.

7. The media of claim 1, wherein the local CSCF server interacts with the S-CSCF through a network-to-network interface (NNI).

8. A mobile access terminal (MAT) capable of accessing an application service hosted by an application server via an internet protocol multimedia system (IMS) network, the MAT comprising a communications device having a system bus that couples a plurality of system components, the plurality of system components comprising:

a display device;

a processor that executes computer-executable instructions read from computer-readable media; and computer-readable media that stores computer-readable instructions, the computer-readable instructions comprising:

(a) a local Call Session Control Function (CSCF) server that runs on the MAT, the local CSCF server comprising one or more features of a Serving Call Session Control Function (S-CSCF), wherein the local CSCF server interacts, according to a predetermined relationship, with a Serving Call Session Control Function (S-CSCF) hosted by the IMS network to facilitate access to the application service, wherein the predetermined relationship is determined in advance based on a specification of the MAT that defines the one or more features of the S-CSCF executable on the MAT;

(b) an application-service client that runs on the MAT, wherein the application-service client communicates with an application server to facilitate access to an application service hosted by an application server, wherein the application-service client is developed, at least in part, based on the specification of the MAT that defines the one or more features of the S-CSCF executable on the MAT; and (c) a local control interface that facilitates interaction between the local CSCF server and the application-service client to facilitate access to the application service.

9. The device of claim 8, wherein the local CSCF server comprises one or more features of a Serving Call Session Control Function (S-CSCF).

10. The device of claim 9, wherein the local control interface comprises one or more features of an IMS Service Control (ISC) interface.

11. The device of claim 8, wherein the computer-readable instructions further comprise a local Home Subscriber Server (HSS) that manages a plurality of user-profile portions stored on one or more computer-readable media on the MAT.

12. The device of claim 11, wherein the plurality of user-profile portions is retrieved from an HSS associated with the IMS network.

13. The device of claim 11, wherein each of the plurality of user-profile portions comprises one or more IMS service qualifications associated with the user.

14. One or more non-transitory computer-readable media having computer-executable instructions embodied thereon for performing a method of using a local Call Session Control Function (CSCF) server running on a mobile access terminal (MAT) to access an application service via an internet protocol multimedia subsystem (IMS) network, the method comprising:

detecting an installation of an application-service client on the MAT, the application-service client comprising a client program that communicates with an application server to facilitate access to an application service hosted by the application server, creating a local control interface on the MAT, the local control interface comprising one or more features of an IMS Service Control (ISC) interface, wherein the local control interface facilitates interaction between the local CSCF server and the application-service client;

retrieving interoperability information from the application-service client, wherein the interoperability information comprises information of compatibility between the application-service client and the IMS network;

determining that the application service is interoperable with the IMS network based on the interoperability information from the application-service client; and interacting, according to a predetermined relationship, with a Serving Call Session Control Function (S-CSCF) associated with the IMS network to facilitate access to the application service, wherein the predetermined relationship is determined in advance based on a specification of the MAT that defines the one or more features of the S-CSCF executable on the MAT.

15. The media of claim 14, wherein the local CSCF server comprises the one or more features of the S-CSCF a.

16. The media of claim 14, wherein the local CSCF server further comprises one or more features of a Proxy Call Session Control Function (P-CSCF).

17. The media of claim 14, wherein determining that the application service is interoperable with the IMS network comprises analyzing the interoperability information from the application-service client by comparing the interoperability information to network requirement data of the IMS network.

18. The media of claim 14, further comprising retrieving, from a Home Subscriber Server (HSS) associated with the IMS network, a plurality of user-profile portions, each user-profile portion comprising a portion of a user profile corresponding to a user of the MAT.

19. The media of claim 18, further comprising storing the plurality of user-profile portions in a local HSS on the MAT.

20. The media of claim 19, further comprising authenticating a first user by verifying authentication credentials provided by the first user, wherein said verifying comprises referencing a first user-profile portion stored in the local HSS, the first user-profile portion corresponding to the first user.

* * * * *